Feb. 4, 1936.  W. B. PARKER  2,029,337
NOZZLE
Filed Nov. 21, 1932
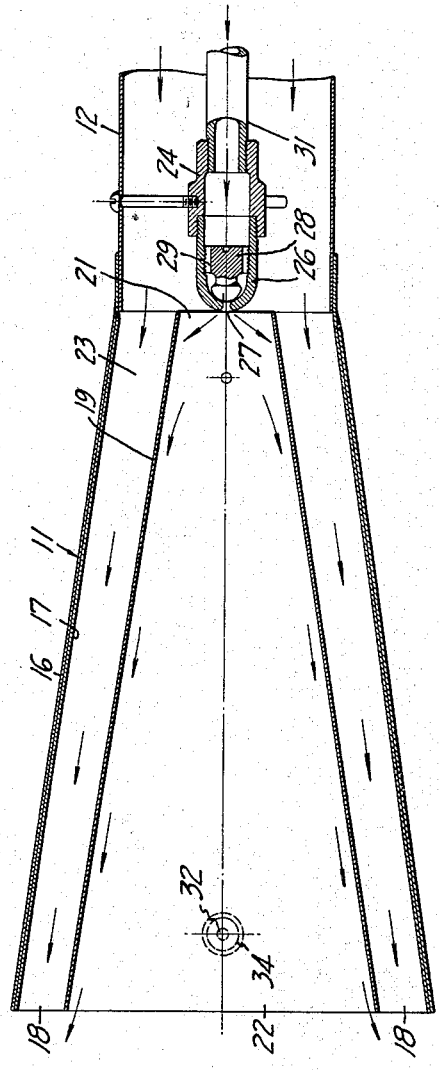
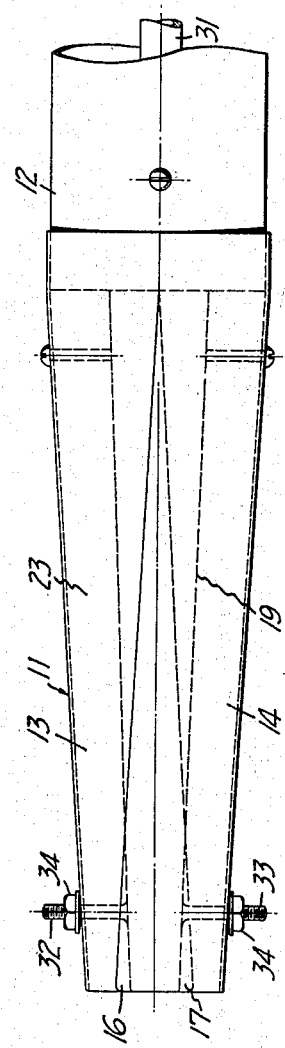
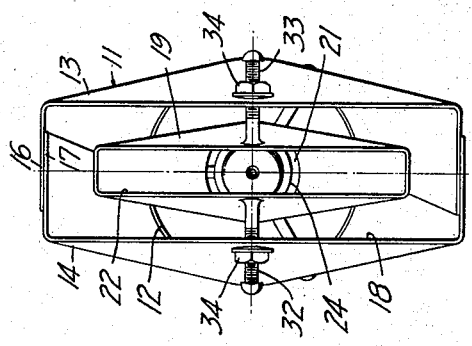
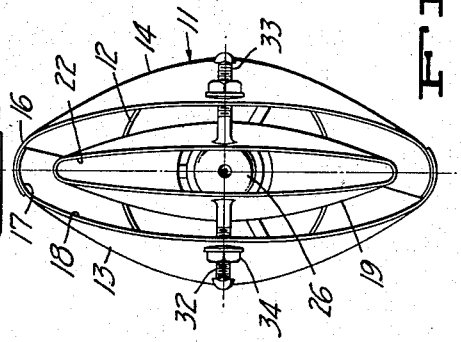
INVENTOR.
William B. Parker
BY
White, Prost, Fleke + Lothrop
ATTORNEYS.

Patented Feb. 4, 1936

2,029,337

UNITED STATES PATENT OFFICE 2,029,337

NOZZLE

William B. Parker, Placerville, Calif., assignor to California Spray-Chemical Corporation, Berkeley, Calif., a corporation of Delaware Application November 21, 1932, Serial No. 643,563

4 Claims. (Cl. 299—140)

My invention relates generally to devices for effecting the distribution or ejection of liquid materials in the form of finely divided particles. More particularly, the invention relates to devices adapted to emit floating, fog-like mists containing minute particles of a liquid material.

While the nozzle of my invention may be employed with any one of a variety of mechanisms which are capable of producing fogs or sprays of liquid materials, such as apparatus for spraying paints and the like upon surfaces, I have successfully utilized my nozzle in and accordingly shall describe the same in connection with apparatus for producing floating, growth-enveloping fog-like mists of insecticidal or fungicidal liquid materials to control plant pests and plant diseases. Apparatus of this character is disclosed in my Patent No. 1,980,427, issued November 13, 1934, and entitled "Apparatus for use in controlling plant pests and plant diseases."

It is an object of my invention to provide a nozzle which in combination with means, such as a blower, for producing an air blast and liquid ejecting means, will produce a floating, fog-like mist of finely divided particles of the ejected material which does not expand relatively rapidly in all directions but carries to the surfaces desired to be reached as an enveloping mass.

Another object of the invention is to provide a nozzle of the aforementioned character which includes an air passage and means for varying the size thereof to regulate the velocity of air passing therethrough.

Other objects of the invention, together with some of the advantageous features thereof, will appear from the accompanying illustrations and the following description of the preferred embodiment of the invention.

Referring to the drawing:

Figure 1 is a cross section of an embodiment of the invention and showing, in cross section, one type of a liquid ejector which may be combined with the invention.

Fig. 2 is an end view of an embodiment of the invention.

Fig. 3 is a plan of the embodiment of my invention which is illustrated in Figs. 1 and 2.

Fig. 4 is an end view of one modification of the invention.

The nozzle of my invention is particularly adapted for use with means, such as a blower, for discharging a blast of air moving at a relatively high velocity and under relatively low pressure together with liquid ejecting means, and in its preferred form, preferably comprises a conduit having a passage in communication with the blower together with a tube supported within the conduit and communicating with the blower as well as with the liquid ejecting means, and means for varying the size of the conduit in order to regulate the velocity of air passing therethru.

Many of the nozzles in present use for producing sprays or fogs of liquid materials are provided with relatively small orifices which frequently become clogged because of the presence of dirt or other foreign matter in the ejected liquid material. Moreover, many of the nozzles now in use are so constructed that even when used in combination with a blast of air produce sprays including relatively large droplets of the liquid material and as a result the material falls rapidly or drips from the nozzle without reaching the surfaces which it is desired to contact. Other nozzles are of such construction that the ejected material is so fine as to vanish or evaporate rapidly in free air. The solution of the aforementioned problems gave rise to the conception of the herein described nozzle.

In accordance with my invention, I provide a conduit 11 which is adapted to be connected to a pipe 12 in communication with the outlet of a blower, not shown. The conduit conveniently can be fabricated of sheet material, such as tin, and I preferably utilize two sheets 13 and 14 which are fitted together so that their lateral extremities overlap one another, as at 16 and 17. Upon actuation of the blower, blasts of air are discharged from the outlet 18 of the conduit 11.

Supported by and within the conduit 11 is a tube 19 having an inlet 21 and an outlet 22, the tube 19 and conduit 11 together forming an annular air passage 23. The tube likewise conveniently can be fabricated of sheet metal and preferably is concentrically positioned with respect to the conduit 11. As illustrated in the drawing, the conduit 11 and tube 19 are arranged so that their outlets 18 and 22 respectively are substantially flush with one another. Likewise in the form illustrated both the conduit 11 and the tube 19 are similar in configuration, their walls being substantially parallel, and their cross sectional areas increasing progressively towards their discharge ends. Tube 19, as will be apparent by reference to the drawing, communicates with the blower as well as with liquid ejecting means which includes a nozzle 24. While the nozzle of my invention may be employed with any type of an atomizing nozzle, I have had good results with and accordingly have illustrated a spray nozzle 24 having a tip 26 of generally semispherical contour and in which a relatively small orifice 27 is formed. The nozzle 24 includes a plug 28 which is adjustable relative to the tip 26 and which is provided with grooves 29 for the passage of liquid material from its source thru the pipe 21. A spray nozzle of this type is disclosed and described in my aforementioned copending application, the nozzle being adapted to liberate the liquid in a cone-shaped spray.

Upon actuation of the blower and with the liquid ejecting means in operation, the liquid is sprayed from the nozzle 24 and received upon the interior surface of the tube 19 and, due to the action of the stream of air entering the inlet 21 of the tube 19, the liquid material is spread or thinned out along the interior surface of the tube so that when it reaches the outlet 22 thereof, the liquid material is in the form of a relatively thin film. The air streams passing thru the passage 23 of the conduit 11 pick up, atomize, and carry the liquid material in the form of a fog-like mist which floats for an appreciable period of time. The air stream thru tube 19 assists atomization.

One of the several factors which determine the characteristic of a fog-like mist liberated from apparatus of the type with which the nozzle of my invention is adapted to be employed is the velocity of the air blast which atomizes, dilutes and carries the liquid material. Provision usually is made at the blower or other apparatus for regulating the velocity of the air blast emitted therefrom. However, I have provided means in the nozzle of my invention so that the air velocity and consequently the character of the fog-like mist which is liberated can be additionally regulated. While any suitable means may be utilized to effect this purpose, the means which I preferably employ include a pair of threaded bolts 32 and 33 which pierce the conduit 11 adjacent the outlet 18 at substantially opposite points and midway of each sheet 13 and 14. The bolts are secured, by any suitable means such as by spot welding, to the tube 19. Threaded upon each bolt is a nut 34 which bear upon the exterior surface of the conduit 11. Upon rotating the nuts 34 in one direction, the conduit, since it is formed of two sheets having overlapping lateral extremities, can be pressed toward the tube 19 thereby providing a restricted passage 23 for the air blast. Upon rotating the nuts 34 in the opposite direction, the conduit 11 retracts and the air passage 23 is enlarged to its original size. When the air passage is constricted, the velocity of air passing therethrough and issuing therefrom is increased and as the passage is enlarged, the air velocity correspondingly is decreased. Hence, the character of the fog-like mist, insofar as size of liquid particles therein and spread of material therein is concerned, is readily controllable.

Another factor which affects the character of the liberated fog-like mist containing liquid material is the form or shape which the liberated air blast takes at the point of liberation. I have found that a cone-shaped blast has a tendency to expand relatively rapidly in all directions upon liberation into free air and is somewhat ineffective insofar as an enveloping fog-like mist is concerned. I have also found that a substantially flat blast of air affords a better and more even or uniform spread of the enveloping fog which because of its fan or broom-like form permits, in the case of treating plants with an insecticidal or fungicidal material, the coverage of a larger area of plants at one movement of the nozzle than is possible with the cone-shaped blast. Accordingly, I have constructed the conduit 11 and tube 19 so that their respective outlets 18 and 22 take a generally rectangular shape, as illustrated in Fig. 2 of the drawing. A substantially flat stream of air can likewise be obtained by forming the outlets 18 and 22 to an elliptical shape, as shown in Fig. 4 of the drawing. Preferably, the inlet of the conduit 11 is circular in contour to permit of convenient attachment to the conventional pipe connections leading to the blower and, in order that the passage of the conduit be uniform in cross-section, the inlet 21 of the tube 19 likewise is formed to a circular shape.

While I have illustrated the preferred embodiment of the invention in the drawing, it is to be understood that I am not to be limited to the form shown, as the invention as defined in the appended claims, can be embodied in a plurality and variety of forms.

I claim:

1. In apparatus for liberating an insecticidal or fungicidal fog-like growth enveloping mist, a conduit having an inlet end adapted to receive a high velocity stream of air and also having an open discharge end, said conduit being of uniformly increasing cross sectional area towards its discharge end, a liquid insecticidal or fungicidal ejector supported adjacent the inlet end of said conduit, said ejector being adapted to liberate the liquid in a diverging spray, a tube substantially conforming to the longitudinal configuration of said conduit, said tube being supported within said conduit with the inlet thereof disposed adjacent the orifice of said ejector, whereby the diverging spray liberated from the ejector is received on the inner surface of said tube, said tube and said conduit forming between them an air passage entirely surrounding the tube, the inlet of the tube being of such area as to allow a portion of the air stream directed to said conduit to pass through said tube whereby the liquid is thinned out along the surface of said tube, and means for varying the cross sectional area of said air passage near the discharge end of the conduit and on opposite sides of the tube.

2. In apparatus for liberating an insecticidal or fungicidal fog-like growth enveloping mist, a conduit having an inlet end adapted to receive a high velocity stream of air and also having a flattened discharge end, opposed side walls of said conduit being movable toward and away from each other, a tube disposed within the conduit and in longitudinal alignment therewith, the tube having an open inlet end adapted to receive a portion of the air stream and also having a flattened discharge end, there being an air passage between both sides of the tube and the side walls of the conduit for receiving the remainder of the air stream, means for introducing a spray of liquid insecticidal or fungicidal material into the tube adjacent its inlet end, and means for adjusting the spacing between the movable side walls of the conduit and the adjacent sides of the tube.

3. In apparatus of the character described, a conduit having an inlet end adapted to receive a high velocity stream of air, the discharge end of said conduit being flattened to form a narrow and substantially rectangular outlet, a tube disposed within the conduit and in longitudinal alignment therewith, the tube having an open inlet end adapted to receive a portion of the air stream, and being flattened at its discharge end in the same plane as said conduit is flattened to form a narrow rectangular outlet of uniform width throughout, there being an air passage between both sides of the tube and the side walls of the conduit for receiving the remainder of the air stream, and a spray nozzle for introducing a spray of liquid into said tube at a distance from the discharge end, whereby a uniform spray is produced throughout the width of said nozzle.

4. An apparatus according to claim 3, in which the discharge ends of both conduit and tube are of uniform width throughout their long dimensions.

WILLIAM B. PARKER.